No. 618,302. Patented Jan. 24, 1899.
J. THOMSON.
DISK WATER METER.
(Application filed Apr. 16, 1898.)
(No Model.)

Witnesses
Inventor
John Thomson
by
Attorneys

THE NORRIS PETERS CO., PHOTO-LITHO., WASHINGTON, D. C.

United States Patent Office.

JOHN THOMSON, OF NEW YORK, N. Y., ASSIGNOR TO THE NEPTUNE METER COMPANY, OF JERSEY CITY, NEW JERSEY.

DISK WATER-METER.

SPECIFICATION forming part of Letters Patent No. 618,302, dated January 24, 1899.

Application filed April 16, 1898. Serial No. 677,831. (No model.)

*To all whom it may concern:*

Be it known that I, JOHN THOMSON, a citizen of the United States, residing at New York, (Brooklyn,) in the county of Kings and State of New York, have invented certain new and useful Improvements in Disk Water-Meters, of which the following is a specification.

This invention relates to improvements in disk water-meters, the object being to provide means for increasing the sensibility of such meters, especially at low rates of flow; and the invention consists in the features of construction and arrangement, substantially as hereinafter set forth.

Figure 1:
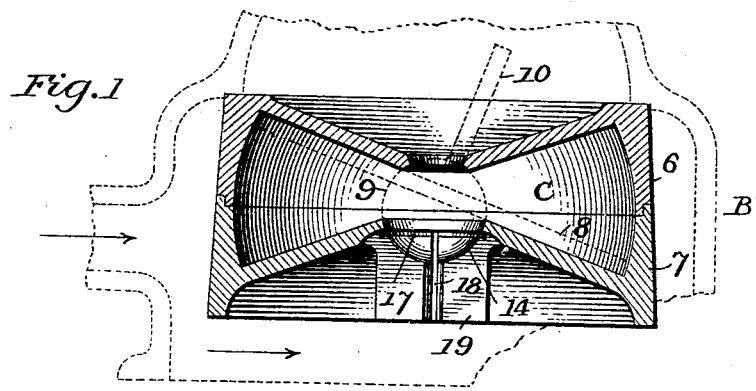
Figure 2:
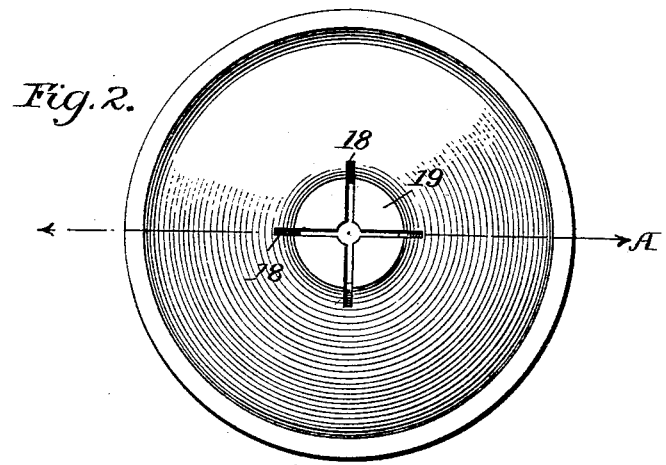
Figure 3:
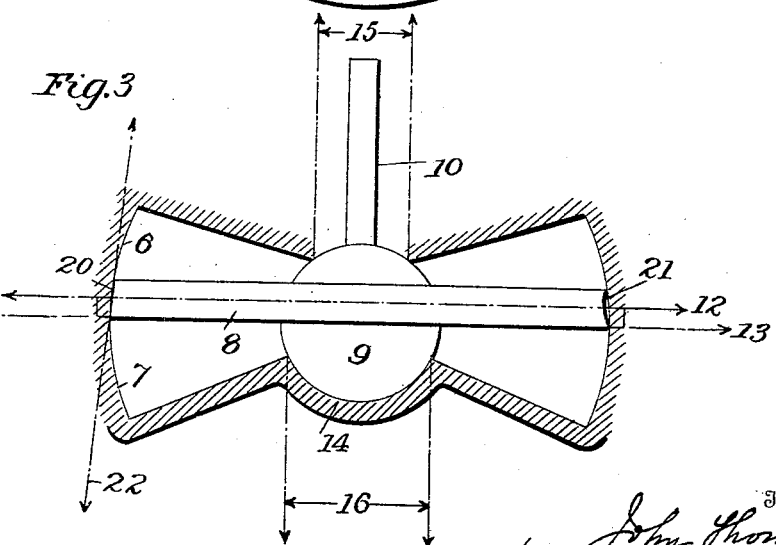

In the drawings, Figure 1 is a vertical central section through the disk-casing, indicating the disk and the main casing in dotted lines. Fig. 2 is a bottom plan view of the lower portion of the disk-casing, and Fig. 3 is an enlarged diagram to better illustrate certain improved features of construction.

In the drawings, 6 7 are the upper and lower casings, respectively, which together form the disk-chamber C.

8 is the disk; 9, the ball; 10, the ball-spindle; and B indicates the external main casing, in which the disk-casing is mounted.

One of the features of my invention consists in providing a film of water or other fluid upon which the ball, disk, and spindle may be said to be floated.

It is well known that in this class of meters it is common to form sockets or bearings in the disk-casings in which the ball supporting the disk and spindle is mounted, and various means have been proposed to overcome friction and permit the ball to be moved as the piston nutates with the least possible obstruction and at the same time prevent any irregularity in its movements. This feature of the invention is shown embodied in a meter in which the medium plane of the disk 8 is above the center 13 of the ball, the advantages of which construction have been fully pointed out in Patent No. 568,640, especially in connection with meters operating at high rates of delivery. Among these advantages is the obtaining of an increased bearing-surface for the ball in the lower ball-bearing socket 14. In this class of meters it has been found that there is a tendency for the ball to clamp in the lower socket, and this is especially true in a meter of the particular arrangement above indicated, as the differences in area between the upper socket and the lower socket (especially when these parts are accurately fitted) affect the perfect operation of the ball. This difference of area is indicated in Fig. 3 by the diameters 15 16, and while the difference is comparatively slight it is sufficient to affect the sensibility of meters at low rates of flow. In order to obviate this difficulty, the bearing in the lower disk-casing is provided with a groove 17, which is shown as a circular groove, and while one is shown it is evident that a number may be provided without departing from the spirit of the invention. This groove is put in communication with the water or other fluid flowing through the meter by some suitable means, as an opening formed in the socket, shown in the present instance in the form of a narrow slit 18 through the bottom of the socket or the hub 19, in which the socket is formed, and preferably there are two slits 18, intersecting each other and the groove 17. It is evident other forms of grooves and openings leading therefrom can be used; but by thus forming the socket or bearing and so arranging the disk-casing that the water flowing to or through the inlet-port will come into the chamber below the disk-casing the ball is supported by dynamic pressure of the relatively highest intensity. The consequence is that the ball, with its disk and spindle, is practically floated upon a film of fluid, and its sensibility is increased without material loss of the advantages of a large bearing-surface, as the groove or grooves and slit or slits need only be a few hundredths of an inch in width.

Another feature of my invention relates to fitting the periphery of the disk to the inside surface of the disk-chamber C. Heretofore the general practice has been to form the periphery of the disk on a spherical zone corresponding with the zone of the chamber, and as shown in Patent No. 485,437, Fig. 8, a number of sharp grooves have been formed in the periphery of the disk. I have found, however, that it is an advantage to provide for a water-packing between the periphery of the disk and the wall of the chamber, and to accomplish this the periphery of the disk may be straight or conical, as at 20, or preferably slightly concave, as indicated at 21, Fig. 3. In either construction the periphery of the disk has two sharp edges, as indicated in Fig. 3, which are brought into contact or close intimacy with the wall of the chamber, leaving a free space between the periphery of the disk and the wall of the disk-chamber to serve for a water-packing. Not only does this serve for a water-packing, but it also relieves small particles of matter which may pass either of the edges and prevents the binding of the disk. It has also a manufacturing advantage in that a disk with its periphery of this shape is more easily made than the usual forms.

What I claim is—

1. In a water-meter, the combination with a bearing, of a ball fitting the bearing, the bearing being provided with a groove having communication with the inflowing fluid, substantially as described.

2. In a water-meter, the combination with a bearing, of a ball fitting the bearing, the bearing being provided with a groove and a slit forming a means of communication between the groove and the inflowing fluid, substantially as described.

In testimony whereof I have signed my name to this specification in the presence of two subscribing witnesses.

JOHN THOMSON.

Witnesses:
F. L. FREEMAN,
J. J. McCARTHY.